United States Patent
You et al.

(10) Patent No.: US 12,437,806 B2
(45) Date of Patent: Oct. 7, 2025

(54) SEMICONDUCTOR DEVICE AND OPERATING METHOD THEREOF

(71) Applicant: TAIWAN SEMICONDUCTOR MANUFACTURING COMPANY, LTD., Hsinchu (TW)

(72) Inventors: Wei-Xiang You, Kaohsiung (TW); Cheng-Yin Wang, Taipei (TW); Szuya Liao, Hsinchu County (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 116 days.

(21) Appl. No.: 18/344,058

(22) Filed: Jun. 29, 2023

(65) Prior Publication Data

US 2025/0006254 A1    Jan. 2, 2025

(51) Int. Cl.
*G11C 11/412*    (2006.01)
*H10B 10/00*    (2023.01)

(52) U.S. Cl.
CPC ........ *G11C 11/4125* (2013.01); *H10B 10/125* (2023.02)

(58) Field of Classification Search
CPC .. G11C 11/4125; G11C 11/412; H10B 10/125
USPC ........................................................ 365/154
See application file for complete search history.

(56) References Cited

U.S. PATENT DOCUMENTS

| | | | | |
|---|---|---|---|---|
| 10,672,465 | B1* | 6/2020 | Agrawal | G06N 3/065 |
| 2019/0244666 | A1* | 8/2019 | Hsu | G11C 14/009 |
| 2021/0158859 | A1* | 5/2021 | Gupta | G11C 11/4094 |
| 2021/0201998 | A1* | 7/2021 | Yuh | G11C 11/418 |

OTHER PUBLICATIONS

Nonvolatile SRAM (NV-SRAM) Using Functional MOSFET Merged with Resistive Switching Devices; all pages; Yamamoto et al. 2009. IEEE 2009 custom integrated circuits conference. (Year: 2009).*
Chiu et al., "A Low Store Energy, Low VDDmin, Nonvolatile 8T2R SRAM with 3D Stacked RRAM Devices for Low Power Mobile Applications", 2010 Symposium on VLSI Circuits, 2010, pp. 229-230.
Yamamoto et al., "Nonvolatile SRAM (NV-SRAM) Using Functional MOSFET Merged with Resistive Switching Devices", 2009 IEEE Custom Integrated Circuits Conference, 2009, pp. 531-534.

* cited by examiner

*Primary Examiner* — Fernando Hidalgo
(74) *Attorney, Agent, or Firm* — Birch, Stewart, Kolasch & Birch, LLP

(57) ABSTRACT

A semiconductor device includes a first memory cell and a second memory cell. The first memory cell is configured to store a first data bit at a first node when the first memory cell is turned on. The second memory cell is configured to store the first data bit when the first memory cell is turned off. The first memory cell comprises a first switch coupled to the first node, and the first switch is configured to transmit the first data bit to the second memory cell, and configured to be turned off when the first memory cell is turned off.

20 Claims, 12 Drawing Sheets

SEMICONDUCTOR DEVICE AND OPERATING METHOD THEREOF

BACKGROUND

A Non-volatile memory (NVM) is a type of memory that can retain stored information even after power is removed. In contrast, volatile memory needs constant power in order to retain data. A static random-access memory (SRAM) is a typical volatile memory and may be coupled to the NVM to backup data bit when the SRAM is power-off.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
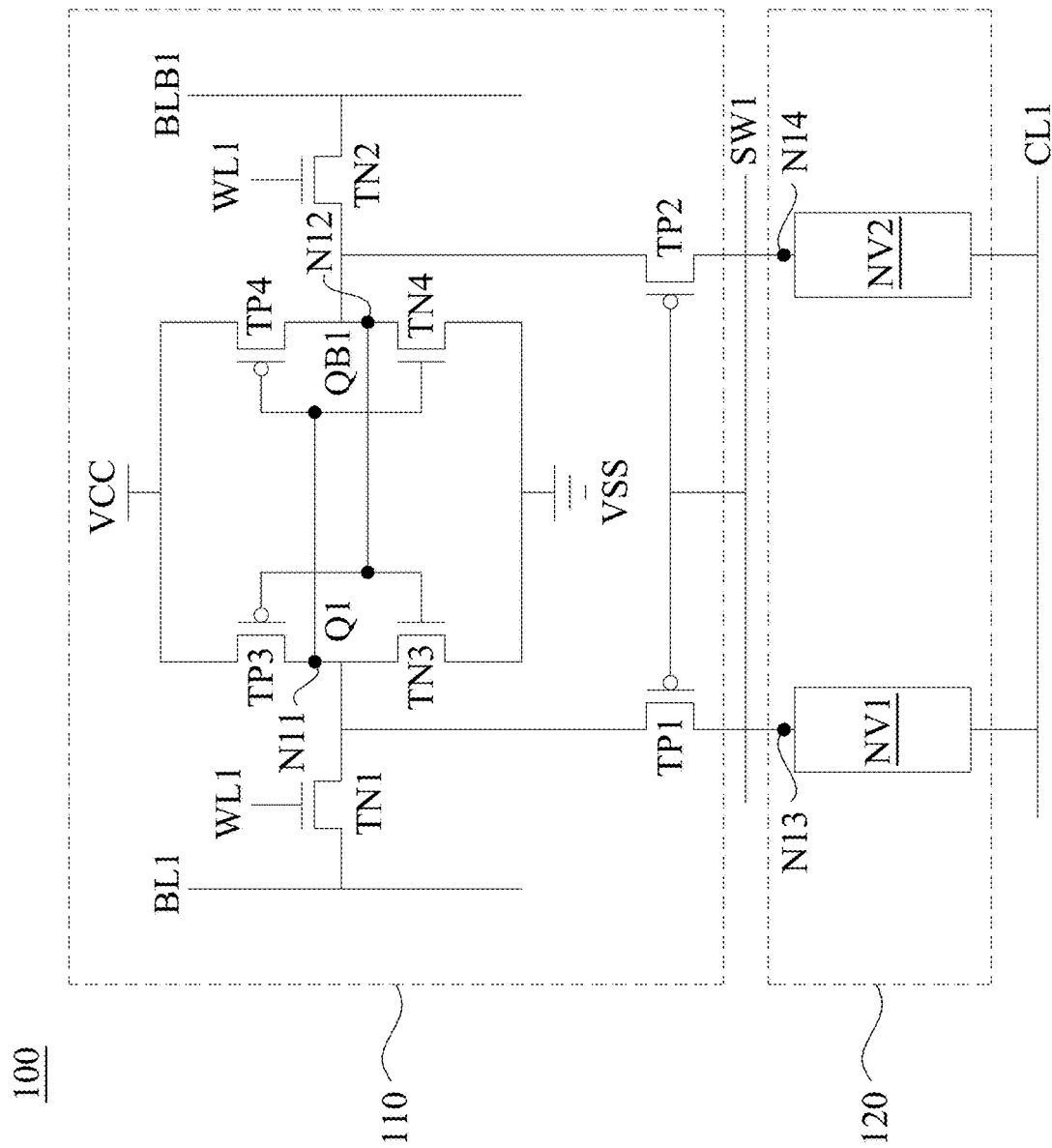
FIG. 1A is a schematic circuit diagram of a semiconductor device, in accordance with some embodiments of the present disclosure.

The following disclosure provides many different embodiments, or examples, for implementing different features of the provided subject matter. Specific examples of components, materials, values, steps, arrangements or the like are described below to simplify the present disclosure. These are, of course, merely examples and are not intended to be limiting. Other components, materials, values, steps, arrangements or the like are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The device may be otherwise oriented (rotated 90 degrees or at other orientations) and the spatially relative descriptors used herein may likewise be interpreted accordingly. The term mask, photolithographic mask, photomask and reticle are used to refer to the same item.

The terms applied throughout the following descriptions and claims generally have their ordinary meanings clearly established in the art or in the specific context where each term is used. Those of ordinary skill in the art will appreciate that a component or process may be referred to by different names. Numerous different embodiments detailed in this specification are illustrative only, and in no way limits the scope and spirit of the disclosure or of any exemplified term.

It is worth noting that the terms such as "first" and "second" used herein to describe various elements or processes aim to distinguish one element or process from another. However, the elements, processes and the sequences thereof should not be limited by these terms. For example, a first element could be termed as a second element, and a second element could be similarly termed as a first element without departing from the scope of the present disclosure.

In the following discussion and in the claims, the terms "comprising," "including," "containing," "having," "involving," and the like are to be understood to be open-ended, that is, to be construed as including but not limited to. As used herein, instead of being mutually exclusive, the term "and/or" includes any of the associated listed items and all combinations of one or more of the associated listed items.

FIG. 1A is a schematic circuit diagram of a semiconductor device 100, in accordance with some embodiments of the present disclosure.

As illustratively shown in FIG. 1A, the semiconductor device 100 includes memory cells 110 and 120. In some embodiments, the semiconductor device 100 includes multiple memory cells (not shown in FIG. 1A) arranged in rows and column, and is configured to store multiple data bits. In various embodiments, the other memory cells in the semiconductor device 100 have configurations similar with configurations of the memory cells 110 and 120. The configurations of the memory cells 110 and 120 are described as follows.

In some embodiments, the memory cell 110 corresponds to a static random-access memory (SRAM), and the memory cell 120 corresponds to a nonvolatile memory (NVM), such as resistive random-access memory (RRAM), magnetic tunneling junction (MTJ), ferroelectric capacitor/field-effect transistor (FET), and/or silicon-oxide-nitride-oxide-silicon (SONOS).

As illustratively shown in FIG. 1A, the memory cell 110 includes switches TN1-TN4 and TP1-TP4. A first terminal of the switch TN1 is configured to receive a bit line signal BL1. A second terminal of the switch TN1 is coupled to a node N11. A control terminal of the switch TN1 is configured to receive a word line signal WL1. A first terminal of the switch TN2 is configured to receive a bit line signal BLB1. A second terminal of the switch TN2 is coupled to a node N12. A control terminal of the switch TN2 is configured to receive the word line signal WL1. A first terminal of the switch TN3 is configured to receive a reference voltage signal VSS. A second terminal of the switch TN3 is coupled to the node N11. A control terminal of the switch TN3 is coupled to the node N12. A first terminal of the switch TN4 is configured to receive the reference voltage signal VSS. A second terminal of the switch TN4 is coupled to the node N12. A control terminal of the switch TN4 is coupled to the node N11.

As illustratively shown in FIG. 1A, a first terminal of the switch TP1 is coupled to the node N11. A second terminal of the switch TP1 is coupled to the memory cell 120 at a node N13. A control terminal of the switch TP1 is configured to receive a control signal SW1. A first terminal of the switch TP2 is coupled to the node N12. A second terminal of the switch TP2 is coupled to the memory cell 120 at a node N14. A control terminal of the switch TP2 is configured to receive the control signal SW1. A first terminal of the switch TP3 is configured to receive a reference voltage signal VCC. A second terminal of the switch TP3 is coupled to the node N11. A control terminal of the switch TP3 is coupled to the node N12. A first terminal of the switch TP4 is configured to receive the reference voltage signal VCC. A second terminal of the switch TP4 is coupled to the node N12. A control terminal of the switch TP4 is coupled to the node N11.

In some embodiments, in response to the reference voltage signal VCC having a voltage level VH, the memory cell 110 is turned on. In response to the reference voltage signal VCC having a voltage level VL, the memory cell 110 is turned off. In some embodiments, the reference voltage signal VSS is maintained at the voltage level VL. In some embodiments, the voltage level VH is higher than the voltage level VL. In some embodiments, the turning on and turning off of the memory cell 110 are referred to as power on and power off of the memory cell 110.

In some embodiments, the memory cell 110 is configured to store a data bit Q1 at the node N11, and store a complementary data bit QB1 at the node N12. The data bits Q1 and QB1 are complementary to each other. In some embodiments, switches TN1-TN4 and TP1-TP4 are implemented by transistors of different conductive types. For example, the switches TN1-TN4 are implemented by N-type metal-oxide-semiconductor (NMOS) transistors, and the switches TP1-TP4 are implemented by P-type metal-oxide-semiconductor (PMOS) transistors. Accordingly, the switches TN1-TN4 are turned on in response to the voltage level VH, and the switches TP1-TP4 are turned on in response to the voltage level VL.

As illustratively shown in FIG. 1A, the memory cell 120 includes memory elements NV1 and NV2. A first terminal of the memory element NV1 is coupled to the second terminal of the switch TP1. A second terminal of the memory element NV1 is configured to receive a voltage signal CL1. A first terminal of the memory element NV2 is coupled to the second terminal of the switch TP2. A second terminal of the memory element NV2 is configured to receive the voltage signal CL1.

In some embodiments, the switch TP1 is configured to transmit the data bit Q1 to the memory element NV1, such that the memory element NV1 stores the data bit Q1 at the node N13. Similarly, the switch TP2 is configured to transmit the complementary data bit QB1 to the memory element NV2, such that the memory element NV2 stores the complementary data bit QB1 at the node N14. In some embodiments, the memory elements NV1 and NV2 are configured to store the data bits Q1 and QB1 when the memory cell 110 is turned off.

In some embodiments, when the memory cell is turned on, the switch TP1 is configured to transmit the data bit Q1 from the memory element NV1 to the node N11, and the switch TP2 is configured to transmit the data bit QB1 from the memory element NV2 to the node N12, to restore a state of the memory cell 110. Alternatively stated, the memory cell 120 is configured to backup data bits Q1 and Q2 for the memory cell 110.

Figure 1B:
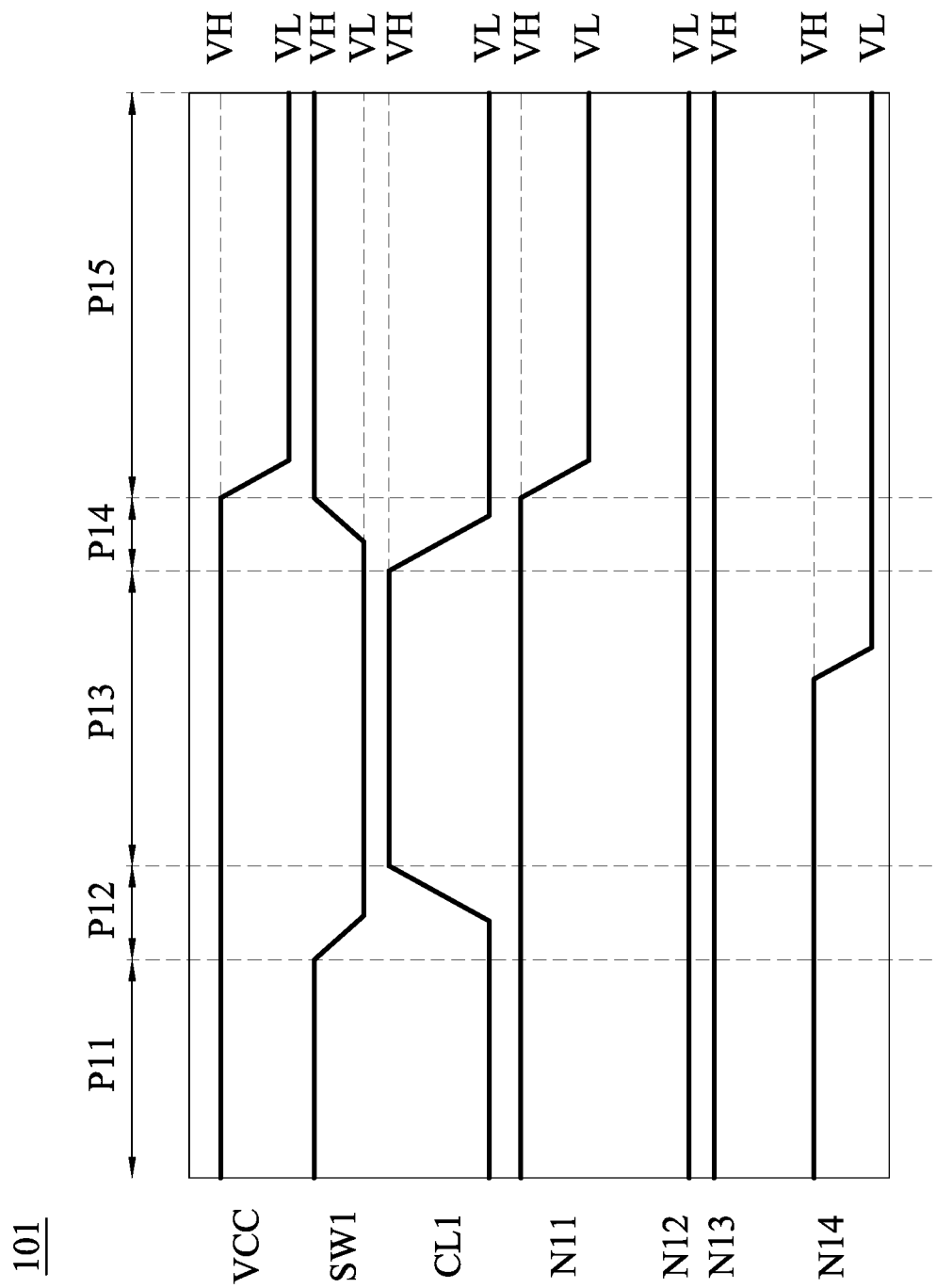
FIG. 1B is a timing diagram associated with the signals of the semiconductor device shown in FIG. 1A, in accordance with some embodiments of the present disclosure.

FIG. 1B is a timing diagram 101 associated with the signals of the semiconductor device 100 shown in FIG. 1A, in accordance with some embodiments of the present disclosure. As illustratively shown in FIG. 1B, the timing diagram 101 includes period P11-P15 arranged continuously in order.

During the period P11, the reference voltage signal VCC has the voltage level VH, such that the memory cell 110 is turned on. The nodes N11 and N12 have voltage levels VH and VL, respectively. The data bit Q1 has a first logic value corresponding to the voltage level VH, such as a logic value of 1. The data bit QB1 has a second logic value corresponding to the voltage level VL, such as a logic value of 0. In response to the voltage level VL at the nodes N12, the switch TP3 is turned on, to transmit the reference voltage signal VCC to the node N11. In response to the voltage level VH at the nodes N11, the switch TN4 is turned on, to transmit the reference voltage signal VSS to the node N12.

On the other hand, during the period P11, the control signal SW1 has the voltage level VL to turn off each of the switches TP1 and TP2, such that the switch TP1 isolates the memory element NV1 from the node N11, and the switch TP2 isolates the memory element NV2 from the node N12. Accordingly, each of the nodes N13 and N14 has the voltage level VH. At this moment, the voltage signal CL1 has the voltage level VL to deactivate the memory elements NV1 and NV2.

In some embodiments, during the period P11, the memory cell 110 stores the data bits Q1 and QB1 normally. Accordingly, the period P11 is referred to as a normal SRAM operation period. In some embodiments, during the normal SRAM operation period, the switches TN1 and TN2 are turned on to read or write the data bits Q1 and QB1.

During the period P12, the control signal SW1 is changed from the voltage level VH to the voltage level VL, such that each of the switches TP1 and TP2 is turned on. Accordingly, the switch TP1 couples the node N11 to the node N13, and the switch TP2 couples the node N12 to the node N14. The voltage signal CL1 is changed from the voltage level VL to the voltage level VH to activate the memory elements NV1 and NV2 for a backup operation.

During the period P13, the switch TP1 transmits the data bit Q1 to the node N13 and the switch TP2 transmits the data bit QB1 to the node N14, such that the node N13 is maintained at the voltage level VH and the node N14 is changed from the voltage level VH to the voltage level VL. Accordingly, the memory elements NV1 and NV2 store the data bits Q1 and QB1, respectively. Alternatively stated, the memory elements NV1 and NV2 backup the data bits Q1 and QB1.

During the period P14, the control signal SW1 is changed from the voltage level VL to the voltage level VH, such that each of the switches TP1 and TP2 is turned off. The switch TP1 isolates the memory element NV1 from the node N11, and the switch TP2 isolates the memory element NV2 from the node N12. The voltage signal CL1 is changed from the voltage level VH to the voltage level VL to deactivate the memory elements NV1 and NV2 from the backup operation.

In some embodiments, during the periods P12-P14, the memory cell 120 backups the data bits Q1 and QB1. Accordingly, the periods P12-P14 are referred to as a backup period.

During the period P15, the reference voltage signal VCC is changed from the voltage level VH to the voltage level VL, such that the memory cell 110 is turned off, and each of the nodes N11 and N12 is discharged to the voltage level VL. The control signal SW1 is maintained at the voltage level VL, such that the switch TP1 isolates the node N13 from the node N11, and the switch TP2 isolates the node N14 from the node N12.

In some embodiments, during the period P15, the reference voltage signal VCC has the voltage level VL, such that the memory cell 110 is considered as power off. Accordingly, the period P15 is referred to as a power off period.

In some approaches, an NVM cell is coupled directly to nodes of an SRAM cell storing data bits for backup the data bits. However, in such approaches, leakage currents flow from the nodes through the NVM cell and thus stability issues occur.

Compared to the above approaches, in some embodiments of the present disclosure, the switches TP1 and TP2 are turned off during the normal SRAM operation period and the power off period, to isolate the memory cell 120 from the memory cell 110. Accordingly, leakage currents are reduced and the stability is increased.

Figure 1C:
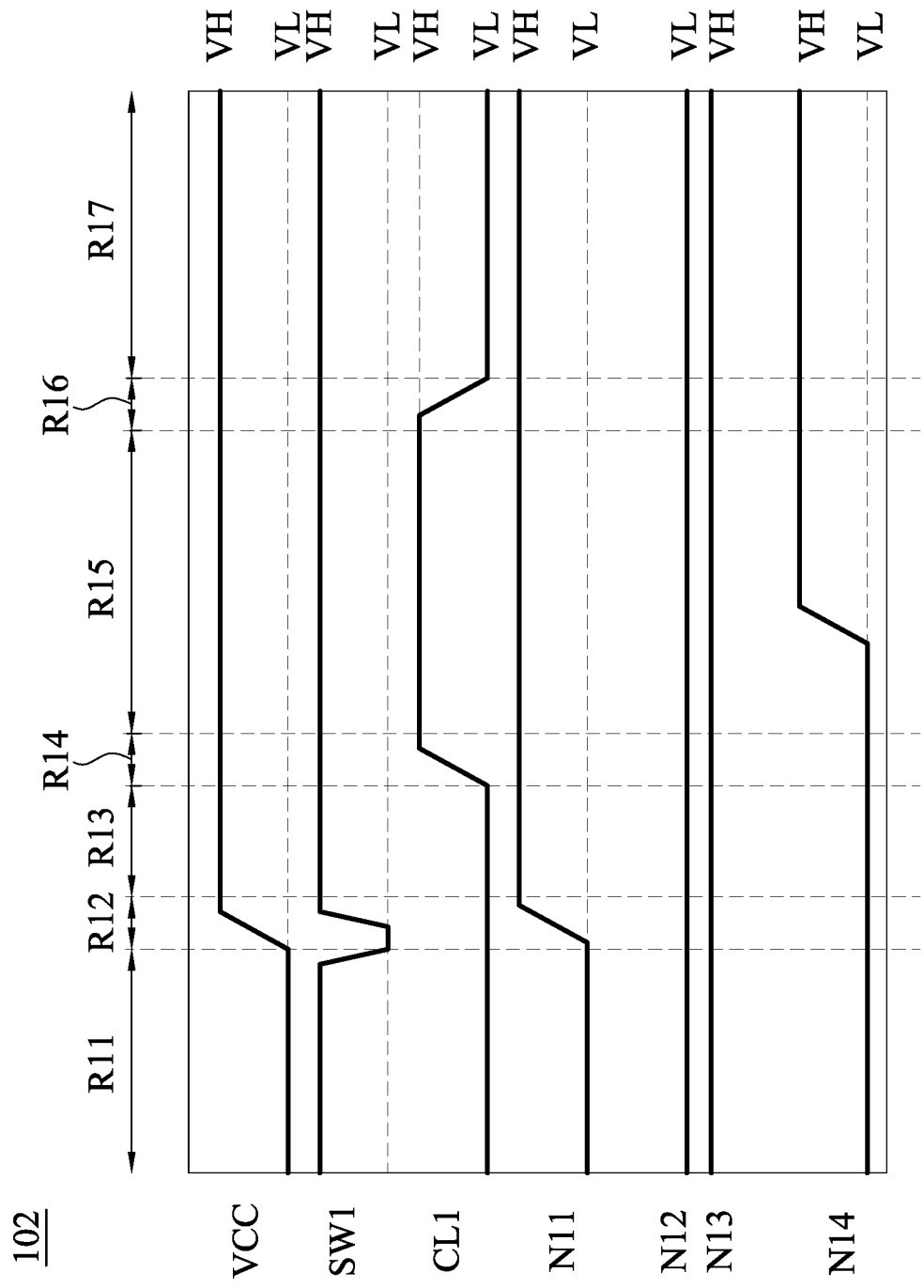
FIG. 1C is another timing diagram associated with the signals of the semiconductor device shown in FIG. 1A, in accordance with some embodiments of the present disclosure.

FIG. 1C is another timing diagram 102 associated with the signals of the semiconductor device 100 shown in FIG. 1A, in accordance with some embodiments of the present disclosure. As illustratively shown in FIG. 1C, the timing diagram 102 includes period R11-R17 arranged continuously in order.

During the period R11, the reference voltage signal VCC has the voltage level VL, such that the memory cell 110 is turned off. The nodes N13 and N14 have voltage levels VH and VL, respectively. Accordingly, the memory element NV1 stores the data bit Q1 having the first logic value, and the memory element NV1 stores the data bit QB1 having the second logic value.

In some embodiments, during the period R11, the reference voltage signal VCC has the voltage level VL, such that the memory cell 110 is considered as power off. Accordingly, the period R11 is referred to as a power off period.

During the period R12, the reference voltage signal VCC is changed from the voltage level VL to the voltage level VH, such that the memory cell 110 is turned on. The control signal SW1 has the voltage level VL to turn on each of the switches TP1 and TP2, such that the nodes N13 and N14 are coupled to the nodes N11 and N12, respectively. Accordingly, the switch TP1 transmit the data bit Q1 to the node N11, and the switch TP2 transmit the data bit QB1 to the node N12, such that the node N11 is changed from the voltage level VL to the voltage level VH, and the node N12 is maintained at the voltage level VL.

As described above, during the period R12, the memory cell 110 restores the data bits Q1 and QB1 at the nodes N11 and N12 from the memory cell 120. Accordingly, in some embodiments, the period R12 is referred to as a restore period.

During the period R13, the reference voltage signal VCC has the voltage level VH, and the memory cell 110 is turned on. The control signal SW1 has the voltage level VH to turn off each of the switches TP1 and TP2, such that the switch TP1 isolates the node N13 from the node N11, the switch TP2 isolates the node N14 from the node N12. At this moment, each of the nodes N11 and N13 has the voltage level VH, and each of the nodes N12 and N14 has the voltage level VL.

During the period R14, the voltage signal CL1 is changed from the voltage level VL to the voltage level VH to activate the memory elements NV1 and NV2 for a reset operation.

During the period R15, the voltage signal CL1 has the voltage level VH to reset the memory elements NV1 and NV2. Accordingly, the node N13 is maintained at the voltage level VH and the node N14 is changed from the voltage level VL to the voltage level VH.

During the period R16, each of the nodes N13 and N14 is maintained at the voltage level VH. The voltage signal CL1 is changed from the voltage level VH to the voltage level VL to terminate the reset operation. In some embodiments, the periods R14-R16 are referred to as a reset period.

During the period R17, the reference voltage signal VCC has the voltage level VH, such that the memory cell 110 is turned on. The nodes N11 and N12 store the data bits Q1 and QB1, respectively. In some embodiments, the period R17 is referred to as a normal SRAM operation period.

Referring to FIG. 1B and FIG. 1C, in some embodiments, the operations of the periods P11-P15 are performed before the operations of the periods R11-R17, and the periods P15 and R11 are arranged continuously in order. In other embodiments, the operations of the periods P11-P15 are performed after the operations of the periods R11-R17, and the periods R17 and P11 are arranged continuously in order.

Figure 2A:
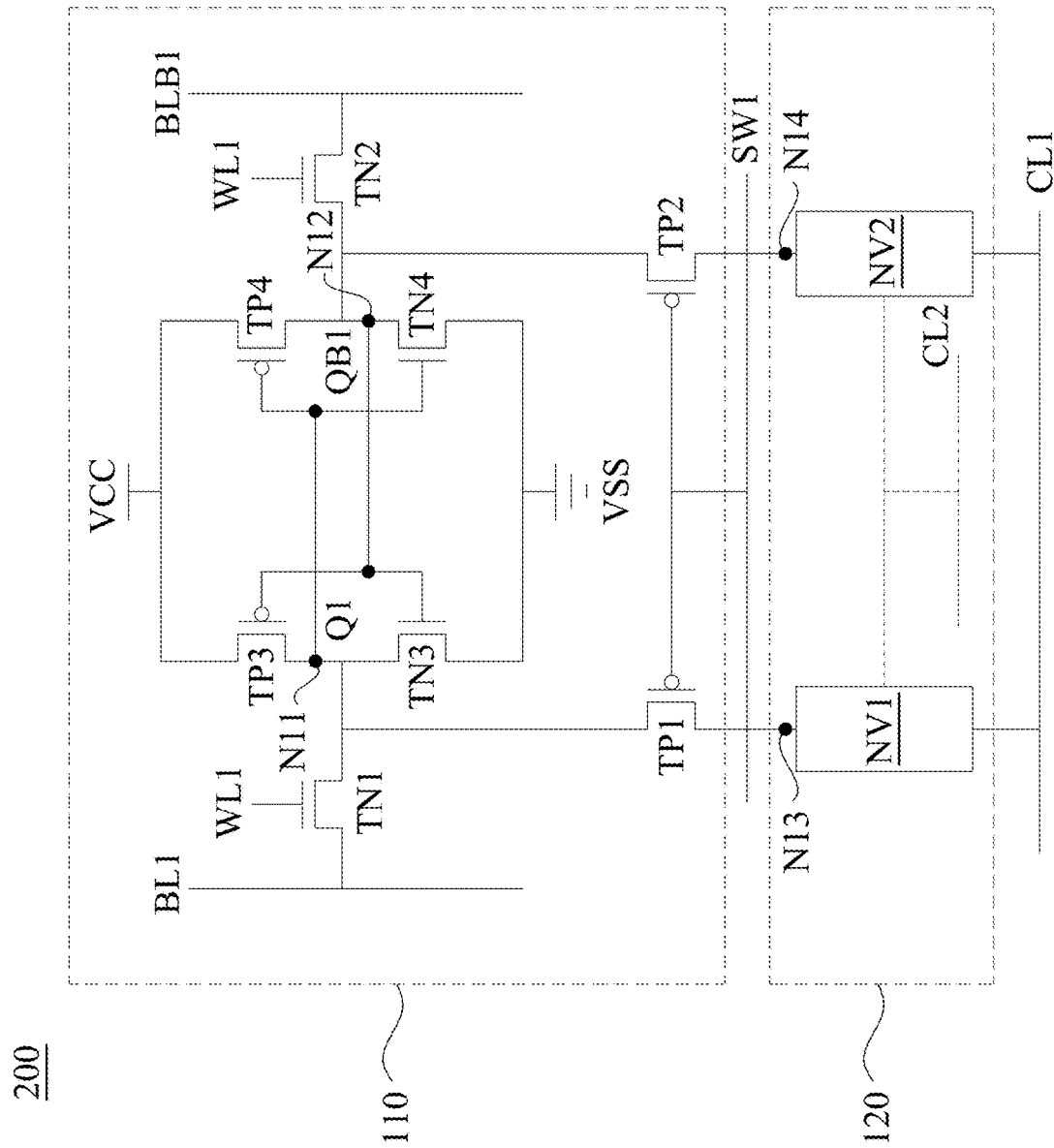
FIG. 2A is a schematic circuit diagram of a semiconductor device corresponding to the semiconductor device shown in FIG. 1A, in accordance with some embodiments of the present disclosure.

FIG. 2A is a schematic circuit diagram of a semiconductor device 200 corresponding to the semiconductor device 100 shown in FIG. 1A, in accordance with some embodiments of the present disclosure. Referring to FIG. 1A and FIG. 2A, the semiconductor device 200 is an alternative embodiment of the semiconductor device 100. FIG. 2A follows a similar labeling convention to that of FIG. 1A. For brevity, the discussion will focus more on differences between FIG. 1A and FIG. 2A than on similarities.

Compared to the semiconductor device 100, the memory cell 120 of the semiconductor device 200 is further configured to receive a voltage signal CL2. As illustratively shown in FIG. 2A, each of third terminals of the memory elements NV1 and NV2 is configured to receive the voltage signal CL2.

Figure 2B:
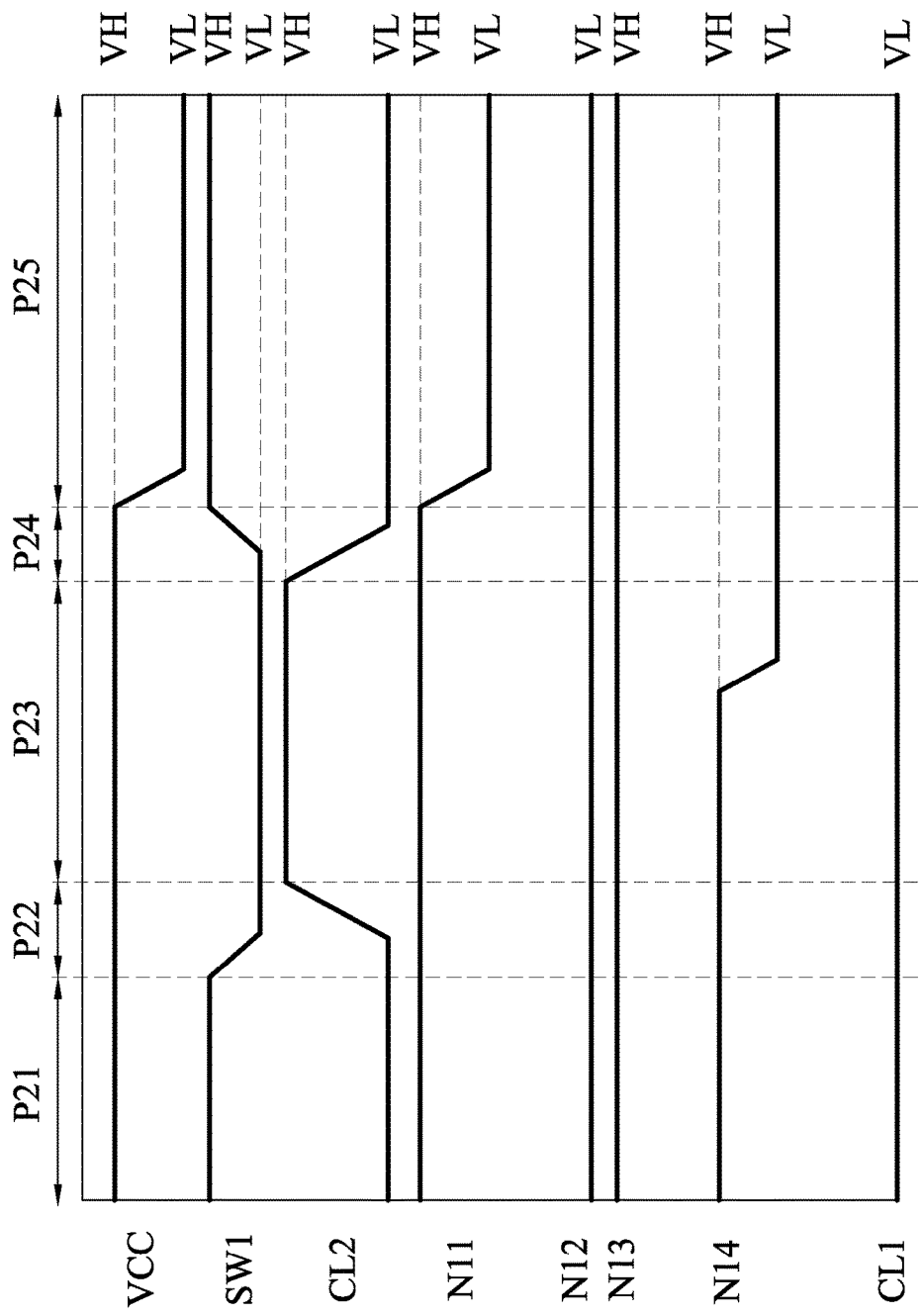
FIG. 2B is a timing diagram associated with the signals of the semiconductor device shown in FIG. 2A, in accordance with some embodiments of the present disclosure.

FIG. 2B is a timing diagram 201 associated with the signals of the semiconductor device 200 shown in FIG. 2A, in accordance with some embodiments of the present disclosure. As illustratively shown in FIG. 2B, the timing diagram 201 includes period P21-P25 arranged continuously in order.

Referring to FIG. 1A, FIG. 1B, FIG. 2A and FIG. 2B, operations of the semiconductor device 200 during periods P21-P25 are similar with the operations of the semiconductor device 100 during periods P11-P15. Therefore, some descriptions are not repeated for brevity.

During the periods P21-P25, the voltage signal CL1 is maintained at the voltage level VL, to stabilize the memory cell 120. During the period P21, voltage signal CL2 has the voltage level VL to deactivate the memory elements NV1 and NV2. During the period P22, the voltage signal CL2 is changed from the voltage level VL to the voltage level VH to activate the memory elements NV1 and NV2 for a backup operation. During the period P14, the voltage signal CL2 is changed from the voltage level VH to the voltage level VL to deactivate the memory elements NV1 and NV2 from the backup operation.

Figure 2C:
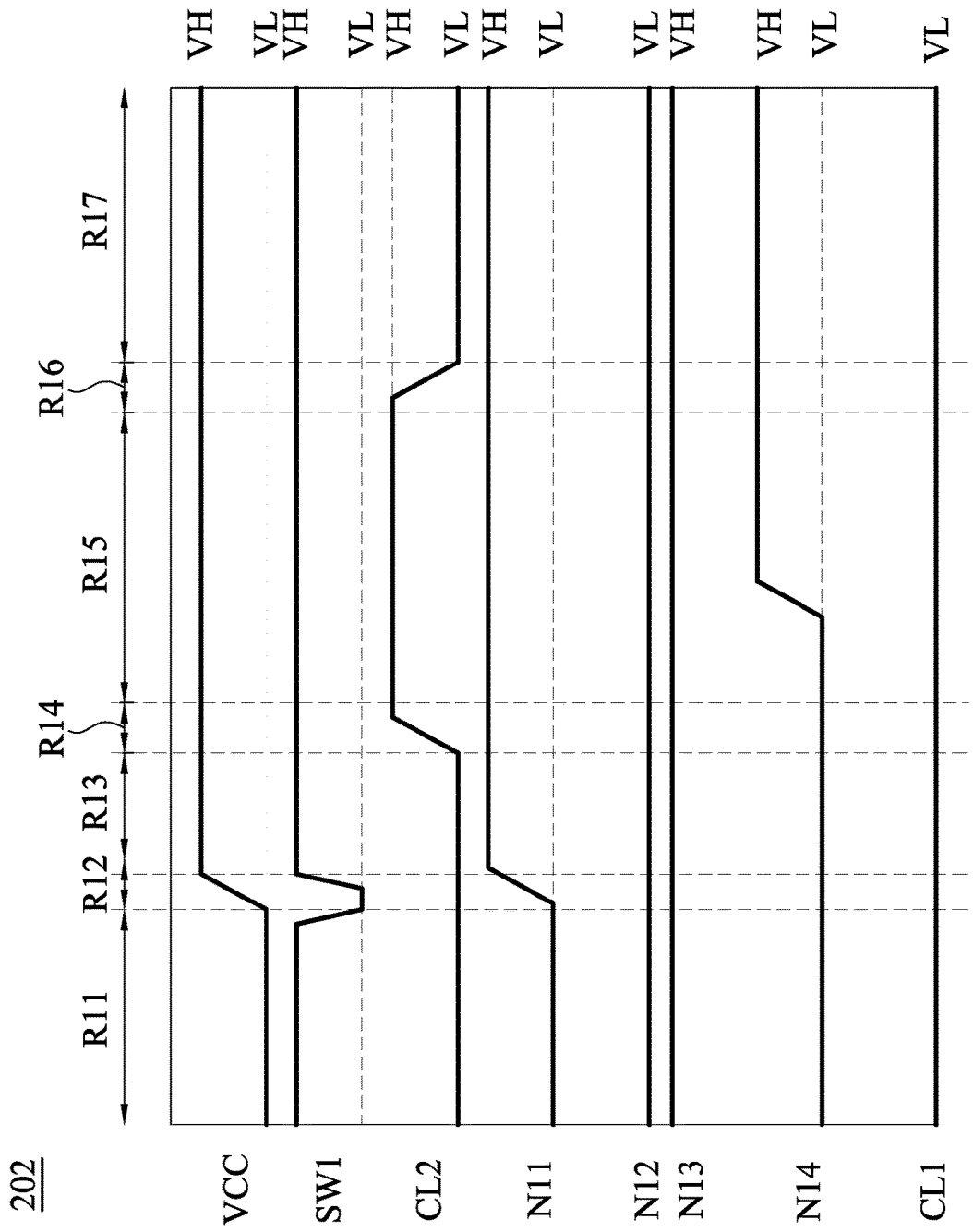
FIG. 2C is a timing diagram associated with the signals of the semiconductor device shown in FIG. 2A, in accordance with some embodiments of the present disclosure.

FIG. 2C is a timing diagram 202 associated with the signals of the semiconductor device 200 shown in FIG. 2A, in accordance with some embodiments of the present disclosure. As illustratively shown in FIG. 2C, the timing diagram 201 includes period R21-R27 arranged continuously in order.

Referring to FIG. 1A, FIG. 1C, FIG. 2A and FIG. 2C, operations of the semiconductor device 200 during periods R21-R27 are similar with the operations of the semiconductor device 100 during periods R11-R17. Therefore, some descriptions are not repeated for brevity.

During the periods R21-R27, the voltage signal CL1 is maintained at the voltage level VL, to stabilize the memory cell 120. During the period R24, the voltage signal CL2 is changed from the voltage level VL to the voltage level VH to activate the memory elements NV1 and NV2 for a reset operation. During the period R25, the voltage signal CL2 has the voltage level VH to reset the memory elements NV1 and NV2. During the period R26, the voltage signal CL2 is changed from the voltage level VH to the voltage level VL to terminate the reset operation.

Figures 3A, 3B:
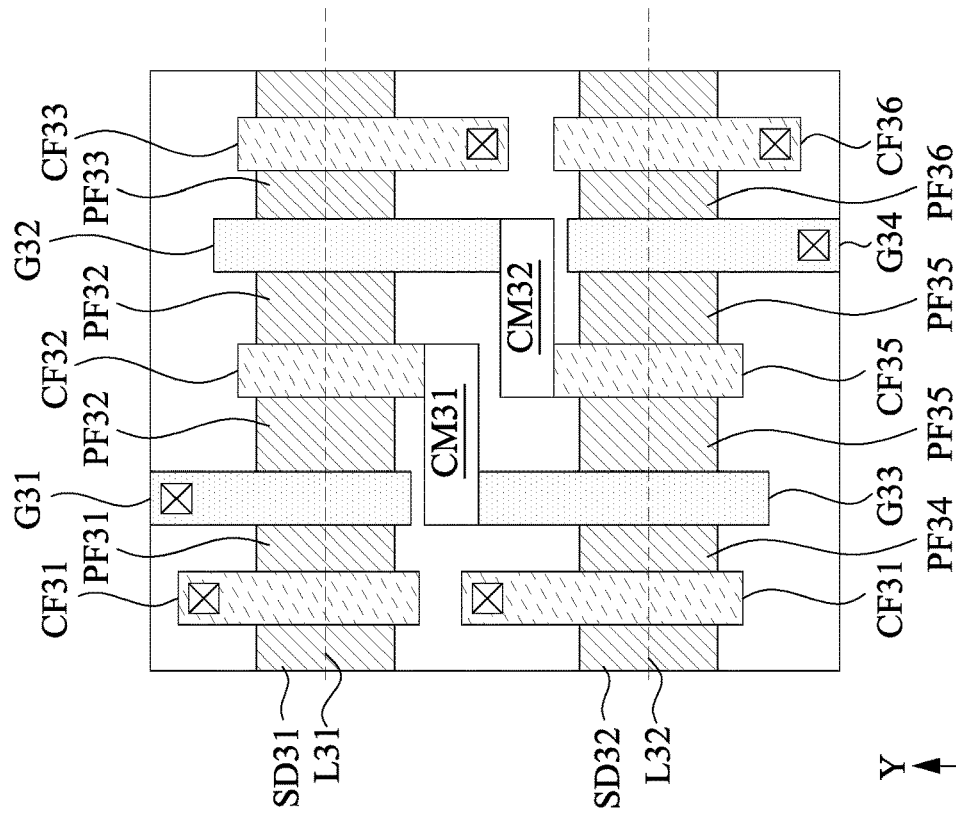
FIG. 3A is a layout diagram of a part of a semiconductor device corresponding to the memory cell shown in FIG. 1A and FIG. 2A, in accordance with some embodiments of the present disclosure.
FIG. 3B is a layout diagram of another part of the semiconductor device corresponding to the memory cell shown in FIG. 1A and FIG. 2A, in accordance with some embodiments of the present disclosure.

FIG. 3A is a layout diagram of a part of a semiconductor device 300 corresponding to the memory cell 110 shown in FIG. 1A and FIG. 2A, in accordance with some embodiments of the present disclosure. A Z direction points out from the paper in FIG. 3A.

As illustratively shown in FIG. 3A, the semiconductor device 300 includes gate structures G31-G34, source/drain structures SD31, SD32 and conductive segments CM31, CM32, CF31-CF36. Each of the source/drain structures SD31, SD32 extends along an X direction. Each of the gate structures G31, G32 and the conductive segments CF31-CF33 extends along a Y direction and is overlapped with the source/drain structure SD31. Each of the gate structures G33, G34 and the conductive segments CF34-CF36 extends along the Y direction and is overlapped with the source/drain structure SD31. In some embodiments, the X direction, the Y direction and the Z direction are perpendicular with each other.

As illustratively shown in FIG. 3A, along the Y direction, the gate structures G31, G32 and the conductive segments CF31-CF33 are aligned with the gate structures G33, G34 and the conductive segments CF34-CF36, respectively. The conductive segment CM31 extends along the X direction, and is configured to couple the gate structure G33 to the conductive segment CF32. The conductive segment CM32 extends along the X direction, and is configured to couple the gate structure G32 to the conductive segment CF35.

As illustratively shown in FIG. 3A, the source/drain structure SD31 includes source/drain portions PF31-PF33 arranged in order along the X direction. The source/drain structure SD32 includes source/drain portions PF34-PF36 arranged in order along the X direction. In some embodiments, the conductive segments CF31-CF36 are coupled to the source/drain portions PF31-PF36, respectively.

Referring to FIG. 1A and FIG. 3A, in some embodiments, the switch TN1 is implemented by the gate structure G31 and the source/drain portions PF31, PF32. The switch TN2 is implemented by the gate structure G34 and the source/drain portions PF35, PF36. The switch TN3 is implemented by the gate structure G32 and the source/drain portions PF32, PF33. The switch TN4 is implemented by the gate structure G33 and the source/drain portions PF34, PF35.

Alternatively stated, the gate structure G31 and the source/drain portions PF31, PF32 are configured to operate as the switch TN1. The gate structure G34 and the source/drain portions PF35, PF36 are configured to operate as the switch TN2. The gate structure G32 and the source/drain portions PF32, PF33 are configured to operate as the switch TN3. The gate structure G33 and the source/drain portions PF34, PF35 are configured to operate as the switch TN4.

In such embodiments, the control terminals of the switches TN1-TN4 correspond to the gate structures G31, G34, G32 and G33, respectively. Each of the gate structures G31 and G34 is configured to receive the word line signal WL1. Each of the conductive segments CF33 and CF34 is configured to receive the reference voltage signal VSS. The conductive segments CF31 and CF36 are configured to receive the bit line signals BL1 and BLB1, respectively. The gate structure G33 and the conductive segments CM31, CF32 correspond to the node N11. The gate structure G32 and the conductive segments CM32, CF35 correspond to the node N12.

FIG. 3B is a layout diagram of another part of the semiconductor device 300 corresponding to the memory cell 110 shown in FIG. 1A and FIG. 2A, in accordance with some embodiments of the present disclosure. The Z direction points out from the paper in FIG. 3B.

As illustratively shown in FIG. 3B, the semiconductor device 300 further includes conductive segments CB31-CB34, gate structures G35, G36 and source/drain structures SD33, SD34. Each of the source/drain structures SD33 and SD34 extends along the X direction. Each of the conductive segments CB31-CB34 extends along the Y direction. Each of the conductive segments CB31, CB32 and the gate structures G35, G32 is overlapped with the source/drain structure SD33. Each of the conductive segments CB33, CB34 and the gate structures G33, G36 is overlapped with the source/drain structure SD34.

As illustratively shown in FIG. 3B, the source/drain structure SD33 includes source/drain portions PB31-PB33 arranged in order along the X direction. The source/drain structure SD34 includes source/drain portions PB34-PB36 arranged in order along the X direction. In some embodiments, the conductive segments CB31-CB34 are coupled to the source/drain portions PB31, PB33, PB34 and PB36, respectively.

Referring to FIG. 3B and FIG. 3A, in some embodiments, the part shown in FIG. 3A is arranged above the part shown in FIG. 3B along the Z direction. The gate structure G32 extends along the Z direction to be coupled to each of the source/drain structures SD31 and SD33. The gate structure G33 extends along the Z direction to be coupled to each of the source/drain structures SD32 and SD34. The conductive segment CF32 extends along the Z direction to be coupled to the source/drain portion PB32. The conductive segment CF35 extends along the Z direction to be coupled to the source/drain portion PB35. Along the Z direction, the gate structures G31 and G35 are separated from each other, and the gate structures G34 and G36 are separated from each other. In some embodiments, the source/drain structures SD31 and SD32 are implemented by N-type material, and the source/drain structures SD33 and SD34 are implemented by P-type material.

Referring to FIG. 1A and FIG. 3B, in some embodiments, the switch TP1 is implemented by the gate structure G35 and the source/drain portions PB31, PB32. The switch TP2 is implemented by the gate structure G36 and the source/drain portions PB35, PB36. The switch TP3 is implemented by the gate structure G32 and the source/drain portions PB32, PB33. The switch TP4 is implemented by the gate structure G33 and the source/drain portions PB34, PB35.

Alternatively stated, the gate structure G35 and the source/drain portions PB31, PB32 are configured to operate as the switch TP1. The gate structure G36 and the source/drain portions PB35, PB36 are configured to operate as the switch TP2. The gate structure G32 and the source/drain portions PB32, PB33 are configured to operate as the switch TP3. The gate structure G33 and the source/drain portions PB34, PB35 are configured to operate as the switch TP4.

In such embodiments, the control terminals of the switches TP1-TP4 correspond to the gate structures G35, G36, G32 and G33, respectively. Each of the gate structures G35 and G36 is configured to receive the control signal SW1. Each of the conductive segments CB32 and CB33 is configured to receive the reference voltage signal VCC. The conductive segment CB31 corresponds to the node N13 and is coupled to the memory element NV1. The conductive segment CB34 corresponds to the node N14 and is coupled to the memory element NV2. The source/drain portion PB32 and PB35 correspond to the nodes N11 and N12, respectively.

In the embodiments described above, when the control signal SW1 has the voltage level VH, the gate structure G35 isolates the source/drain portions PB31 and PB32 from each other, and the gate structure G36 isolates the source/drain portions PB35 and PB36 from each other. As a result, the leakage currents flowing through the source/drain structures SD33 and SD34 are reduced.

On the other hand, when the control signal SW1 has the voltage level VL, the gate structure G35 couples the source/drain portions PB31 and PB32 to each other, and the gate structure G36 couples the source/drain portions PB35 and PB36 to each other. Accordingly, the data bit Q1 is able to be transmitted between the source/drain portions PB31 and PB32, and the data bit QB1 is able to be transmitted between the source/drain portions PB35 and PB36.

Figure 3C:
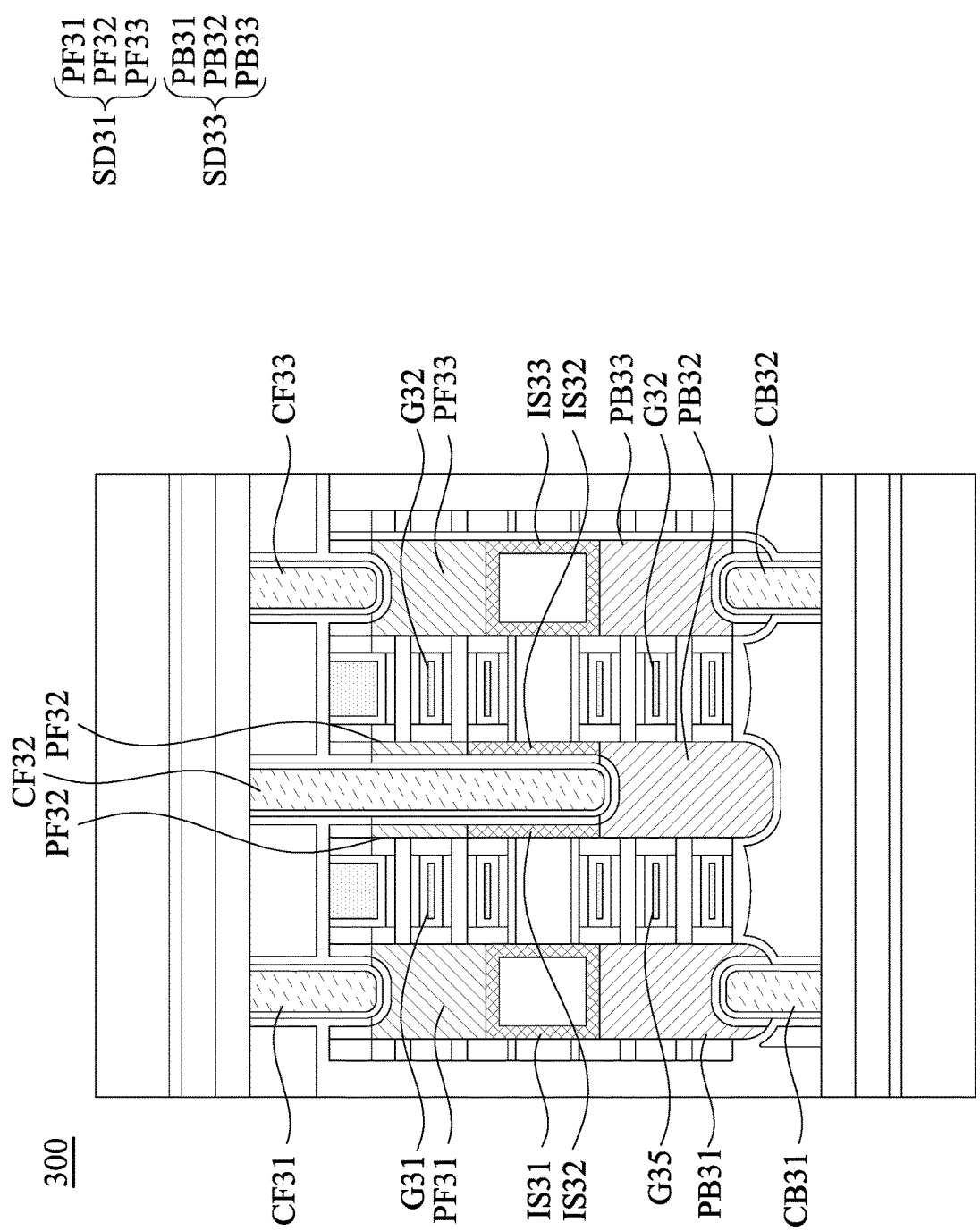
FIG. 3C is a cross section diagram of the semiconductor device along a line shown in FIG. 3A and FIG. 3B, in accordance with some embodiments of the present disclosure.

FIG. 3C is a cross section diagram of the semiconductor device 300 along a line L31 shown in FIG. 3A and FIG. 3B, in accordance with some embodiments of the present disclosure. The Y direction points into the paper in FIG. 3C.

As illustratively shown in FIG. 3C, the semiconductor device 300 further includes isolation structures IS31-IS33. The isolation structure IS31 is formed between the source/drain portions PF31 and PB31 to isolate the source/drain portions PF31 and PB31 from each other. The isolation structure IS32 is formed between the source/drain portions PF32 and PB32 to isolate the source/drain portions PF32 and PB32 from each other. The isolation structure IS33 is formed between the source/drain portions PF33 and PB33 to isolate the source/drain portions PF33 and PB33 from each other. The conductive segment CF31 extends through the source/drain portion PF32 and the isolation structure IS32, to be coupled to the source/drain portion PB32.

Figure 3D:
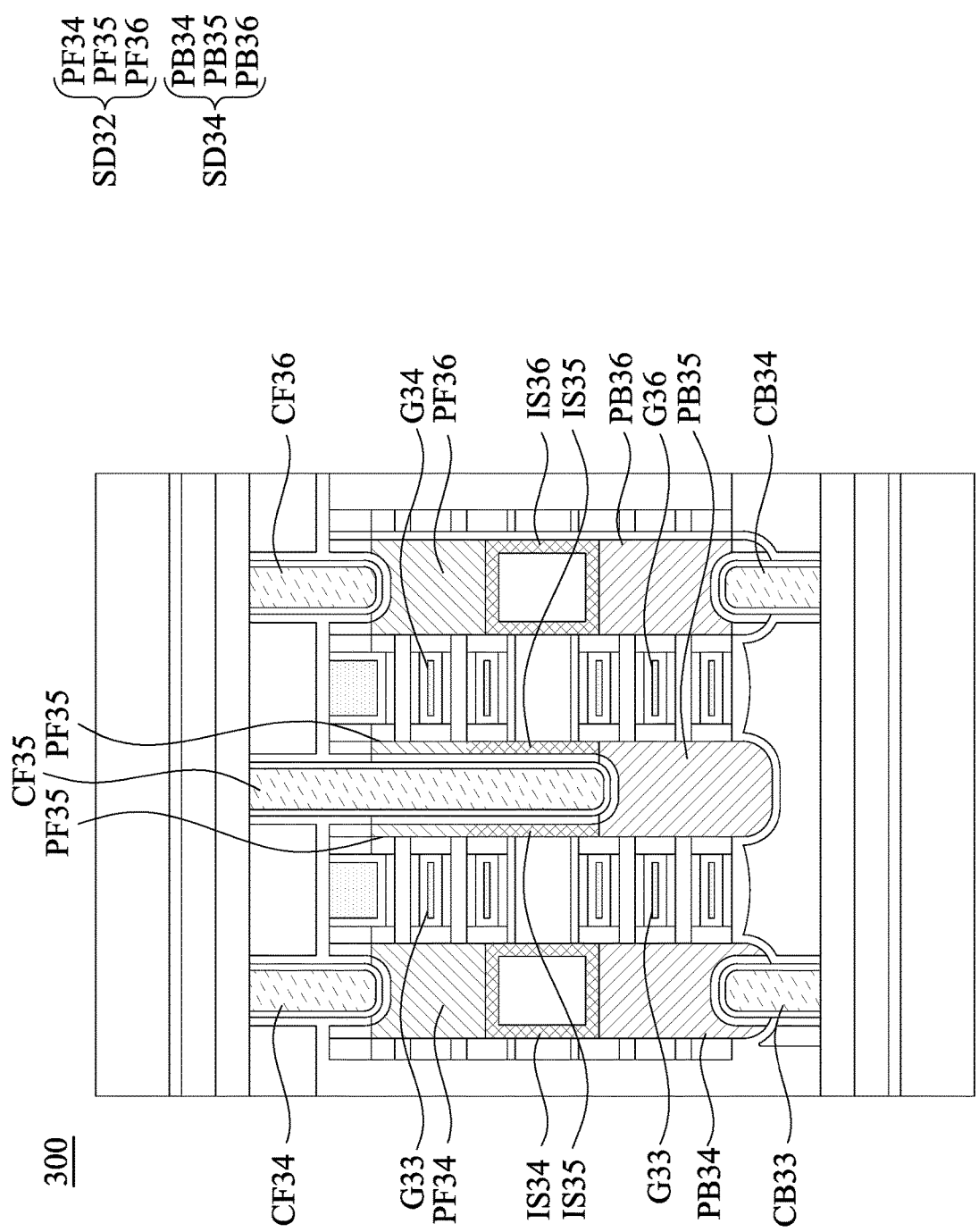
FIG. 3D is a cross section diagram of the semiconductor device along another line shown in FIG. 3A and FIG. 3B, in accordance with some embodiments of the present disclosure.

FIG. 3D is a cross section diagram of the semiconductor device 300 along a line L32 shown in FIG. 3A and FIG. 3B, in accordance with some embodiments of the present disclosure. The Y direction points into the paper in FIG. 3D.

As illustratively shown in FIG. 3D, the semiconductor device 300 further includes isolation structures IS34-IS36. The isolation structure IS34 is formed between the source/drain portions PF34 and PB34 to isolate the source/drain portions PF34 and PB34 from each other. The isolation structure IS35 is formed between the source/drain portions PF35 and PB35 to isolate the source/drain portions PF35 and PB35 from each other. The isolation structure IS36 is formed between the source/drain portions PF36 and PB36 to isolate the source/drain portions PF36 and PB36 from each other. The conductive segment CF35 extends through the source/drain portion PF35 and the isolation structure IS35, to be coupled to the source/drain portion PB35.

Figure 4A:
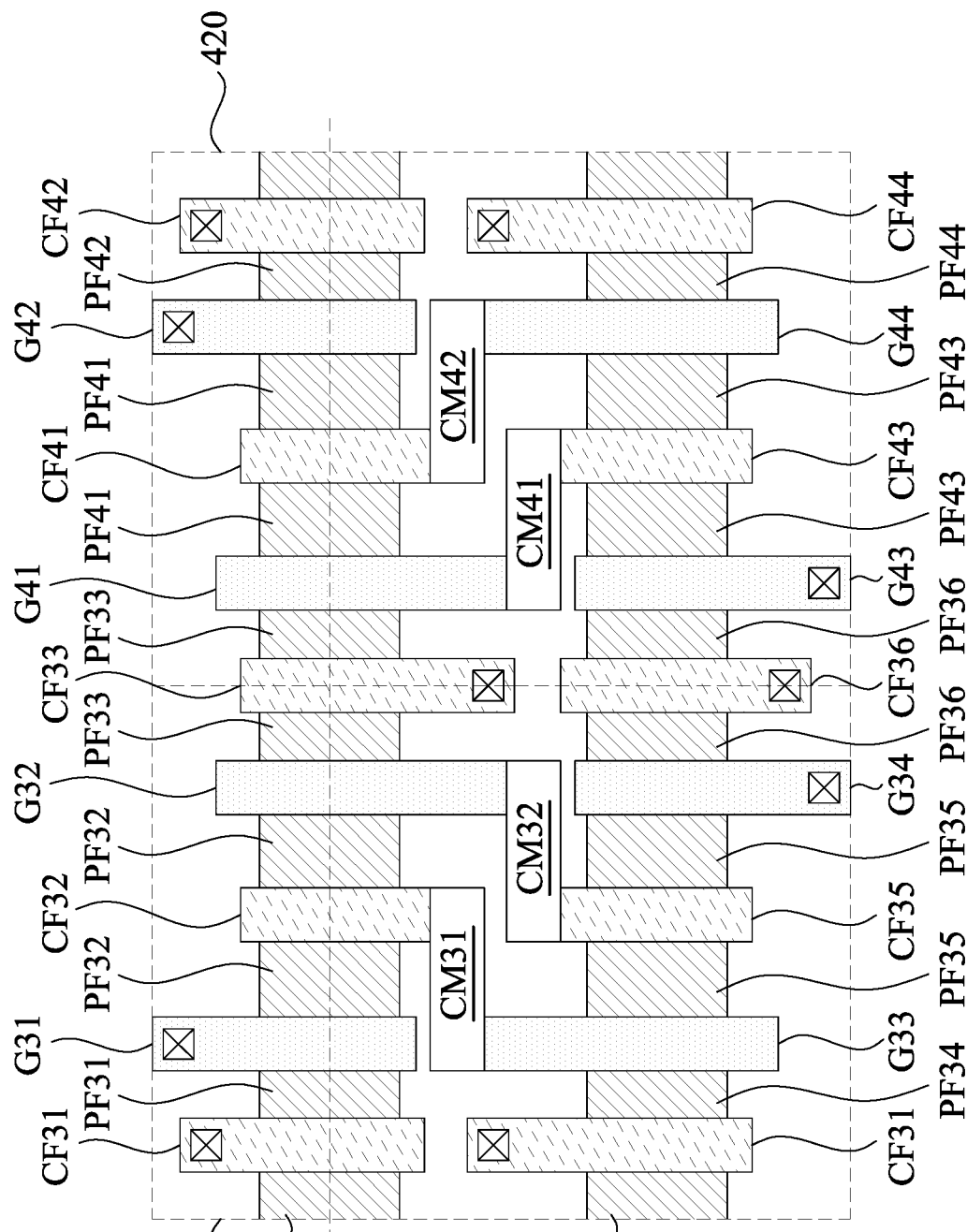
FIG. 4A is a layout diagram of a part of a semiconductor device corresponding to the semiconductor device shown in FIG. 3A, in accordance with some embodiments of the present disclosure.

FIG. 4A is a layout diagram of a part of a semiconductor device 400 corresponding to the semiconductor device 300 shown in FIG. 3A, in accordance with some embodiments of the present disclosure. The Z direction points out from the paper in FIG. 4A. As illustratively shown in FIG. 4A, the semiconductor device 400 includes memory cells 410 and 420. Referring to FIG. 1A and FIG. 4A, in some embodiments, the memory cell 110 is implemented by one of the memory cells 410 and 420, and another memory cell adjacent to the memory cell 110 is implemented by the other one of the memory cells 410 and 420.

Referring to FIG. 3A and FIG. 4A, the semiconductor device 400 is an alternative embodiment of the semiconductor device 300. FIG. 4A follows a similar labeling convention to that of FIG. 3A. For brevity, the discussion will focus more on differences between FIG. 3A and FIG. 4A than on similarities.

Compared to the semiconductor device 300, the semiconductor device 400 further includes gate structures G41-G44 and conductive segments CF41-CF44, CM41, CM42. The source/drain structure SD31 further includes source/drain portions PF41 and PF42. The source/drain structure SD32 further includes source/drain portions PF43 and PF44.

As illustratively shown in FIG. 4A, each of the gate structures G41, G42 and the conductive segments CF41-CF42 extends along the Y direction and is overlapped with the source/drain structure SD31. Each of the gate structures G43, G44 and the conductive segments CF43-CF44 extends along the Y direction and is overlapped with the source/drain structure SD32.

As illustratively shown in FIG. 4A, along the Y direction, the gate structures G41, G42 and the conductive segments CF31-CF32 are aligned with the gate structures G43, G44 and the conductive segments CF33-CF34, respectively. The conductive segment CM41 extends along the X direction, and is configured to couple the gate structure G41 to the conductive segment CF43. The conductive segment CM42 extends along the X direction, and is configured to couple the gate structure G44 to the conductive segment CF41.

As illustratively shown in FIG. 4A, the source/drain portions PF41-PF42 arranged in order along the X direction. The source/drain portions PF43-PF44 arranged in order along the X direction. In some embodiments, the conductive segments CF41-CF44 are coupled to the source/drain portions PF41-PF44, respectively.

Referring to FIG. 1A and FIG. 4A, in some embodiments, the switch TN1 is implemented by the gate structure G42 and the source/drain portions PF41, PF42. The switch TN2 is implemented by the gate structure G43 and the source/drain portions PF43, PF36. The switch TN3 is implemented by the gate structure G41 and the source/drain portions PF41, PF33. The switch TN4 is implemented by the gate structure G44 and the source/drain portions PF43, PF44.

In such embodiments, the control terminals of the switches TN1-TN4 correspond to the gate structures G42, G43, G41 and G44, respectively. Each of the gate structures G42 and G43 is configured to receive the word line signal WL1. Each of the conductive segments CF33 and CF44 is configured to receive the reference voltage signal VSS. The conductive segments CF42 and CF36 are configured to receive the bit line signals BL1 and BLB1, respectively. The gate structure G44 and the conductive segments CM32, CF31 correspond to the node N11. The gate structure G41 and the conductive segments CM41, CF43 correspond to the node N12.

In some embodiments, each of the memory cells 410 and 420 corresponds to a circuit structure similar with the circuit structure of the memory cell 110 shown in FIG. 1A. The conductive segment CF33 is configured to provide the reference voltage signal VSS to each of the memory cells 410 and 420. The conductive segment CF36 is configured to provide the bit line signal BLB1 to each of the memory cells 410 and 420. Alternatively stated, the memory cells 410 and 420 share the conductive segments CF33 and CF36.

Figure 4B:
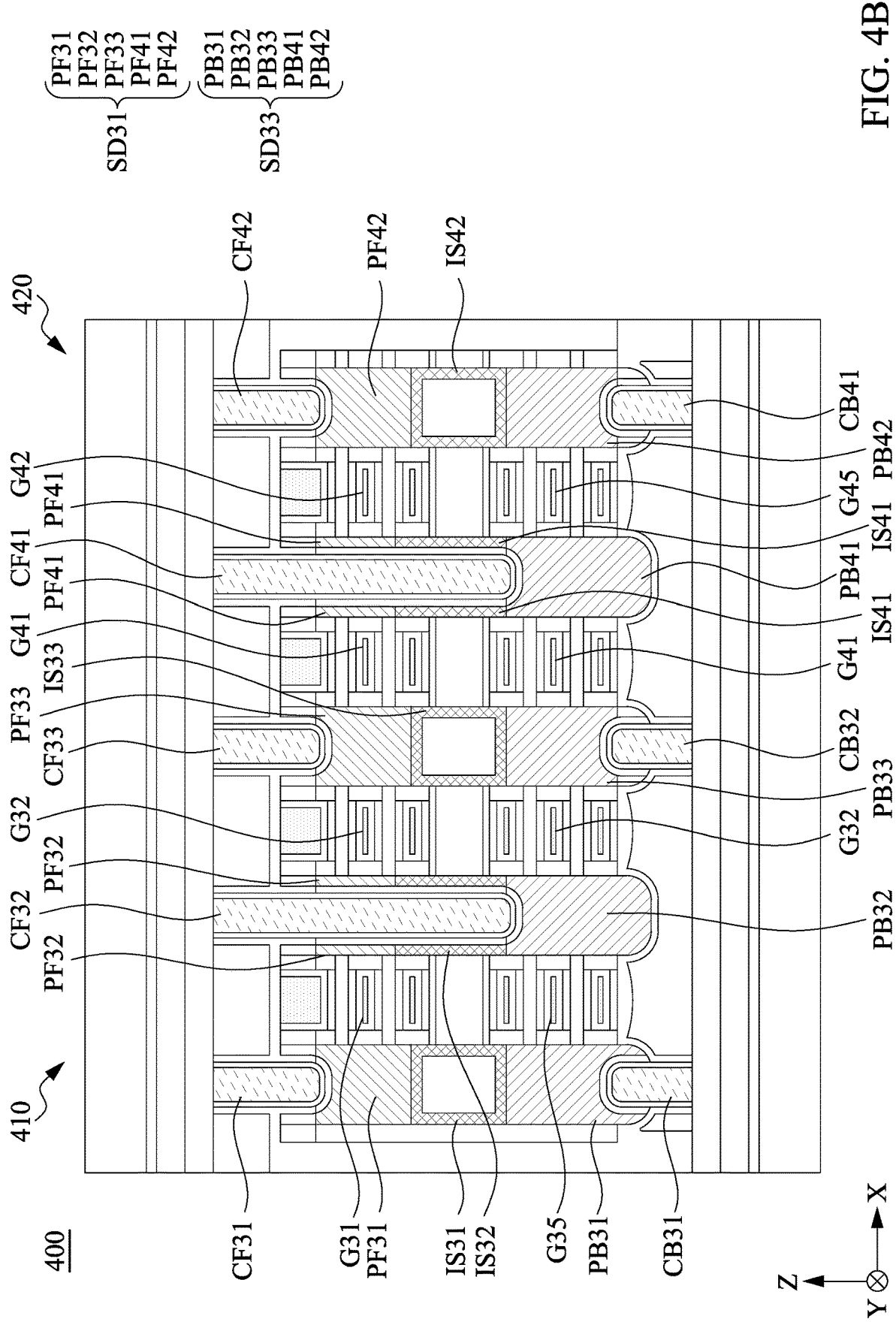
FIG. 4B is a cross section diagram of the semiconductor device along a line shown in FIG. 4A, in accordance with some embodiments of the present disclosure.

FIG. 4B is a cross section diagram of the semiconductor device 400 along a line L41 shown in FIG. 4A, in accordance with some embodiments of the present disclosure. The Y direction points into the paper in FIG. 4A.

Referring to FIG. 3C and FIG. 4B, the semiconductor device 400 is an alternative embodiment of the semiconductor device 300. FIG. 4B follows a similar labeling convention to that of FIG. 3C. For brevity, the discussion will focus more on differences between FIG. 3C and FIG. 4B than on similarities.

Compared to the semiconductor device 300, the semiconductor device 400 further includes a gate structure G45, isolation structures IS41, IS42 and a conductive segment CB41. The source/drain structure SD33 further includes source/drain portions PB41 and PB42.

As illustratively shown in FIG. 4B, the gate structure G41 extends along the Z direction to be coupled to each of the source/drain portions PB41 and PB33. The gate structure G41, the source/drain portion PB41, the gate structure G45 and the source/drain portion PB42 are arranged in order along the X direction. The gate structure G45 is coupled to each of the source/drain portions PB41 and PB42. The isolation structure IS41 is formed between the source/drain portions PF41 and PB41 to isolate the source/drain portions PF41 and PB41 from each other. The isolation structure IS42 is formed between the source/drain portions PF42 and PB42 to isolate the source/drain portions PF42 and PB42 from each other.

Referring to FIG. 1A and FIG. 4A, in some embodiments, the switch TP2 is implemented by the gate structure G41 and the source/drain portions PB33, PB41. The switch TP4 is implemented by the gate structure G45 and the source/drain portions PB41, PB42. In such embodiments, the control terminals of the switches TP2 and TP4 correspond to the gate structures G41 and G42, respectively. The conductive segment CB41 is configured to transmit the reference voltage signal VCC to the source/drain portion PB42.

Figure 5:
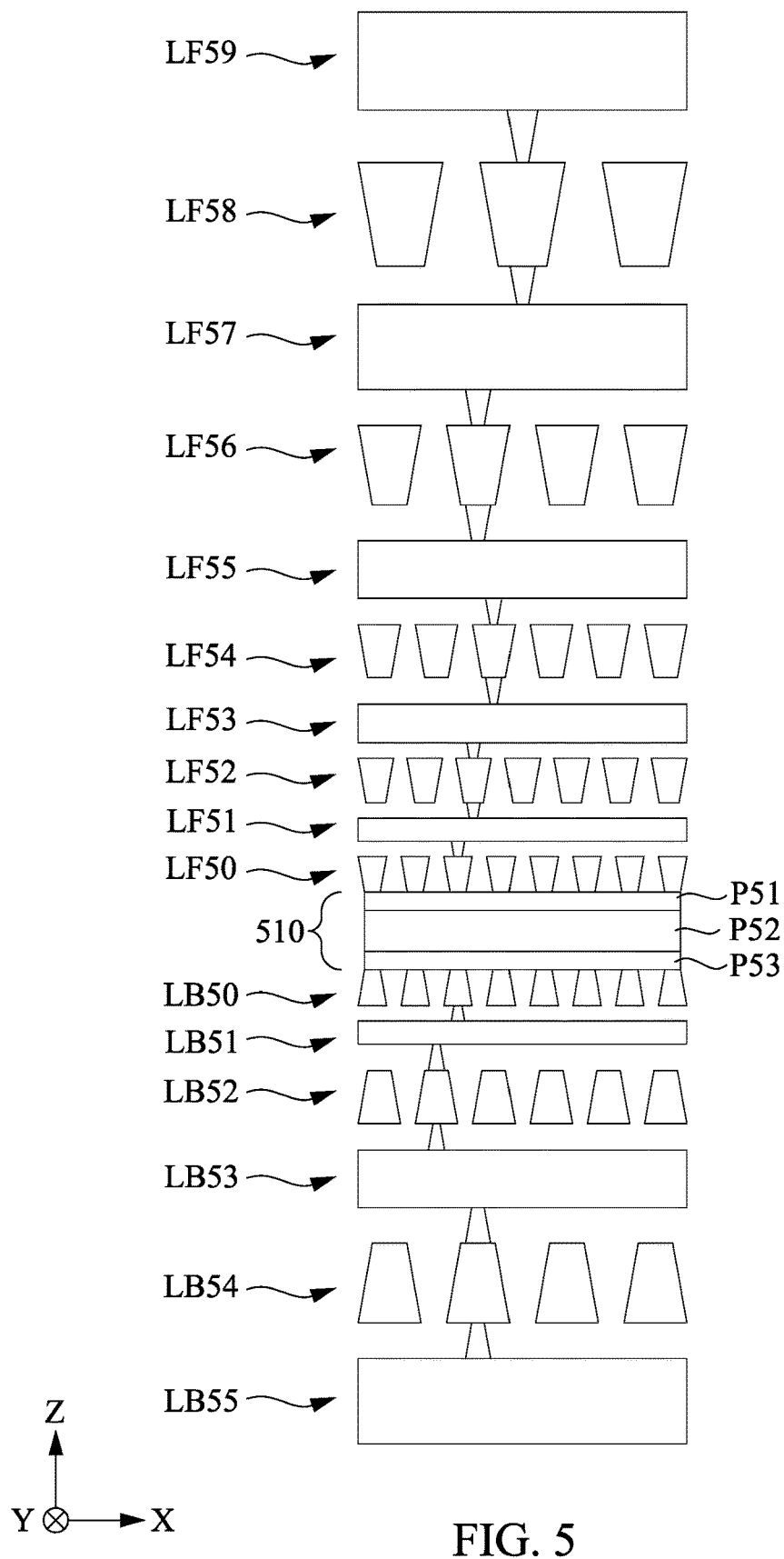
FIG. 5 is a schematic diagram of a semiconductor device corresponding to the semiconductor device shown in FIG. 3C and FIG. 3D, in accordance with some embodiments of the present disclosure.

FIG. 5 is a schematic diagram of a semiconductor device 500 corresponding to the semiconductor device 300 shown in FIG. 3C and FIG. 3D, in accordance with some embodiments of the present disclosure. The Y direction points into the paper in FIG. 5.

As illustratively shown in FIG. 5, the semiconductor device 500 includes a memory cell 510 and conductive layers LF50-LF59, LB50-LB55. The conductive layers LB55, LB54, LB53, LB52, LB51, LB50, the memory cell 510 and the conductive layers LF50-LF59 are arranged in order along the Z direction. Adjacent two of the conductive layers LF50-LF59 and LB50-LB55 are coupled to each other through vias. In some embodiments, the conductive layers LF50-LF59 are formed by front side back-end-of-line (BEOL) process, and the conductive layers LB50-LB55 are formed by back side BEOL process.

In some embodiments, each of the conductive layers LF50-LF59, LB50-LB55 includes multiple conductive segments. The conductive segments in the conductive layers LB54, LB52, LB50, LF50, LF52, LF54, LF56 and LF58 extend along the Y direction. The conductive segments in the conductive layers LB55, LB53, LB51, LF51, LF53, LF55, LF57 and LF59 extend along the X direction.

In some embodiments, when a distance between a first conductive layer and the memory cell 510 is larger than a distance between a second conductive layer and the memory cell 510, a size of the conductive segments in the first conductive layer is larger than a size of the conductive segments in the second conductive layer.

For example, a distance between the conductive layer LF52 and the memory cell 510 is larger than a distance between the conductive layer LF56 and the memory cell 510. Accordingly, a size of the conductive segments in the conductive layer LF52 is larger than a size of the conductive segments in the second conductive layer LF56.

As illustratively shown in FIG. 5, the memory cell 510 includes portions P51-P53 arranged in order along the Z direction. The portion P52 is sandwiched between the portions P51 and P53. In some embodiments, the portion P52 is formed by front-end-of-line (FEOL) process, and each of the portions P51 and P53 is formed by middle-of-line (MOL) process.

Referring to FIG. 1A, FIG. 3C, FIG. 3D and FIG. 5, in some embodiments, the memory cell 510 corresponds to the memory cell 110, and has a structure similar with the structure shown in FIG. FIG. 3C and FIG. 3D. In such embodiments, the conductive segment CB31 is coupled to the memory element NV1 through at least a part of the conductive layers LF50-LF59 and LB50-LB55, and the conductive segment CB34 is coupled to the memory element NV2 through at least a part of the conductive layers LF50-LF59 and LB50-LB55. In some embodiments, the memory elements NV1 and NV2 are processed in the front side BEOL process or the back side BEOL process.

Also disclosed is a semiconductor device. The semiconductor device includes a first memory cell and a second memory cell. The first memory cell is configured to store a first data bit at a first node when the first memory cell is turned on. The second memory cell is configured to store the first data bit when the first memory cell is turned off. The first memory cell comprises a first switch coupled to the first node, and the first switch is configured to transmit the first data bit to the second memory cell, and configured to be turned off when the first memory cell is turned off.

Also disclosed is a semiconductor device. The semiconductor device includes a first conductive segment, a first source/drain structure and a first gate structure. The first conductive segment is configured to store a first data bit. The first source/drain structure is coupled to the first conductive segment. The first gate structure is coupled to a first source/drain portion of the first source/drain structure and a second source/drain portion of the first source/drain structure. The first gate structure is configured to isolate the first source/drain portion and the second source/drain portion from each other during a first period and a second period, and is configured to couple the first source/drain portion and the second source/drain portion to each other during a third period between the first period and the second period.

Also disclosed is a method of operating a semiconductor device. The method includes: during a first period, storing a first data bit and a second data bit by a first memory cell; during a second period, transmitting the first data bit through a first switch to a first node of a second memory cell; during the second period, transmitting the second data bit through a second switch to a second node of the second memory cell; and during a third period, turning off each of the first switch and the second switch. The first period, the second period and the third period are arranged in order, and the second data bit is complementary with the first data bit.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A semiconductor device, comprising:
  a first memory cell configured to store a first data bit at a first node when the first memory cell is turned on; and
  a second memory cell configured to store the first data bit when the first memory cell is turned off,
  wherein the first memory cell comprises a first switch coupled to the first node,
  the first switch is configured to transmit the first data bit to the second memory cell, and configured to be turned off when the first memory cell is turned off, and
  the semiconductor device further comprises:
    a first conductive segment configured to store the first data bit;
    a first source/drain structure coupled to the first conductive segment; and
    a second source/drain structure configured to receive a bit line signal corresponding to the first data bit, and disposed above the first source/drain structure along a direction,
      wherein the first conductive segment is elongated along the direction to be interposed between two portions of the second source/drain structure.

2. The semiconductor device of claim 1, wherein the first memory cell is further configured to store a second data bit at a second node when the first memory cell is turned on,
  the first memory cell comprises a second switch coupled to the second node,
  the second switch is configured to transmit the second data bit to the second memory cell, and configured to be turned off when the first memory cell is turned off, and the second data bit is complementary with the first data bit.

3. The semiconductor device of claim 1, wherein the second memory cell comprises:
  a memory element configured to store the first data bit,
  wherein a first terminal of the memory element is coupled to the first switch,
  a second terminal of the memory element is configured to receive a voltage signal,
  the voltage signal has a first voltage level when the first switch is turned on, and has a second voltage level when the first switch is turned off, and
  the first voltage level is different from the second voltage level.

4. The semiconductor device of claim 1, wherein the first memory cell further comprises:
  a second switch configured to transmit a voltage signal to the first node,
  wherein a first terminal of the second switch is configured to receive the voltage signal, and a second terminal of the second switch is coupled to the first node,
  in response to the voltage signal having a first voltage level, the first memory cell is turned on, and
  in response to the voltage signal having a second voltage level, each of the first memory cell and the first switch is turned off.

5. The semiconductor device of claim 4, wherein the first switch is turned off before the second memory cell stores the first data bit.

6. The semiconductor device of claim 1, wherein the first switch is further configured to transmit the first data bit from the second memory cell to the first node when the first memory cell is turned on.

7. The semiconductor device of claim 1, wherein the first switch is turned off during a first period,
  the first switch is turned on to transmit the first data bit from the second memory cell to the first node during a second period,
  the first switch is further turned off during a third period, and
  the first period, the second and the third period are arranged in order.

8. A semiconductor device, comprising:
  a first conductive segment configured to store a first data bit;
  a first source/drain structure coupled to the first conductive segment;
  a first gate structure coupled to a first source/drain portion of the first source/drain structure and a second source/drain portion of the first source/drain structure; and
  a second source/drain structure configured to receive a bit line signal corresponding to the first data bit, and disposed above the first source/drain structure along a direction,
  wherein the first gate structure is configured to isolate the first source/drain portion and the second source/drain portion from each other during a first period and a second period, and is configured to couple the first source/drain portion and the second source/drain portion to each other during a third period between the first period and the second period, and
  the first conductive segment is elongated along the direction to be interposed between two portions of the second source/drain structure.

9. The semiconductor device of claim 8, further comprising:

a second conductive segment coupled to the first source/drain portion, and configured to receive the first data bit from the second source/drain portion during the third period.

10. The semiconductor device of claim 9, wherein during a fourth period, the first gate structure is configured to couple the first source/drain portion and the second source/drain portion to each other, to transmit the first data bit from the second conductive segment to the second source/drain portion, and the third period, the second period and the fourth period are arranged in order.

11. The semiconductor device of claim 10, wherein after the fourth period, the first gate structure is configured to isolate the first source/drain portion and the second source/drain portion from each other.

12. The semiconductor device of claim 8, further comprising:

a second conductive segment configured to store a second data bit;

a third source/drain structure coupled to the second conductive segment; and a second gate structure coupled to a third source/drain portion of the third source/drain structure and a fourth source/drain portion of the third source/drain structure, wherein the second gate structure is configured to isolate the third source/drain portion and the fourth source/drain portion from each other during the first period and the second period, and is configured to couple the third source/drain portion and the fourth source/drain portion to each other during the third period, and the second data bit is complementary with the first data bit.

13. The semiconductor device of claim 12, further comprising:

a memory cell coupled to the first source/drain portion and the third source/drain portion, and configured to store the first data bit and the second data bit during the second period.

14. The semiconductor device of claim 13, wherein during a fourth period, the first gate structure is configured to couple the first source/drain portion and the second source/drain portion to each other, to transmit the first data bit from the memory cell to the second source/drain portion, during the fourth period, the second gate structure is configured to couple the third source/drain portion and the fourth source/drain portion to each other, to transmit the second data bit from the memory cell to the fourth source/drain portion, and the third period, the second period and the fourth period are arranged in order.

15. The semiconductor device of claim 14, wherein after the fourth period, the first gate structure is configured to isolate the first source/drain portion and the second source/drain portion from each other, and the second gate structure is configured to isolate the third source/drain portion and the fourth source/drain portion from each other.

16. A method of operating a semiconductor device, comprising:

during a first period, storing a first data bit and a second data bit by a first memory cell;

during a second period, transmitting the first data bit through a first switch to a first node of a second memory cell;

during the second period, transmitting the second data bit through a second switch to a second node of the second memory cell; and during a third period, turning off each of the first switch and the second switch, wherein the first period, the second period and the third period are arranged in order, the second data bit is complementary with the first data bit, a first terminal of the first memory cell receives a first voltage signal, and a second terminal of the first memory cell is coupled to the first switch, and the semiconductor device comprises:

a first conductive segment configured to store the first data bit;

a first source/drain structure coupled to the first conductive segment; and a second source/drain structure configured to receive a bit line signal corresponding to the first data bit, and disposed above the first source/drain structure along a direction, wherein the first conductive segment is elongated along the direction to be interposed between two portions of the second source/drain structure.

17. The method of claim 16, further comprising:

providing a second voltage signal to the first node; and during the second period, changing the second voltage signal from a first voltage level to a second voltage level, wherein a logic value of the first data bit corresponds to the second voltage level.

18. The method of claim 17, further comprising:

during a fourth period, storing the first data bit and the second data bit by the second memory cell;

during a fifth period, transmitting the first data bit through the first switch to the first memory cell; and during a sixth period, turning off the first switch, wherein the second voltage signal has the first voltage level during the sixth period, and has the second voltage level during each of the fourth and the sixth periods.

19. The method of claim 18, further comprising:

during the fifth period, transmitting the second data bit through the second switch to the first memory cell; and during the sixth period, turning off the second switch.

20. The method of claim 18, wherein the first period, the second period, the third period, the fourth period, the fifth period and the sixth period are arranged in order.

* * * * *